March 17, 1970 A. DOLENC 3,500,724

INDEXING PISTON FOR AN INTERNAL COMBUSTION ENGINE

Filed Oct. 25, 1968 6 Sheets-Sheet 1

Inventor:
Anton Dolenc
BY Pennie, Edmonds,
Morton, Taylor and Adams
ATTORNEYS

Inventor:
Anton Dolenc
BY
ATTORNEYS

Inventor:
Anton Dolenc

United States Patent Office 3,500,724
Patented Mar. 17, 1970

3,500,724
INDEXING PISTON FOR AN INTERNAL
COMBUSTION ENGINE
Anton Dolenc, Winterthur, Switzerland, assignor to
Sulzer Brothers Limited, Winterthur, Switzerland,
a Swiss company
Filed Oct. 25, 1968, Ser. No. 770,650
Claims priority, application Switzerland, Oct. 26, 1967,
15,039/67
Int. Cl. F01b 3/00; F16j 1/24
U.S. Cl. 92—31                                       11 Claims

ABSTRACT OF THE DISCLOSURE

The indexing mechanism for an indexing piston assembly comprises an indexing ring disposed about the spherical bearing of the piston at the small end of the connecting rod, the indexing ring being caused to reciprocate in a plane perpendicular to the longitudinal axis of the piston by the pivoting motion of the connecting rod relative to the piston. Inertial mass means associated with the indexing ring (for example, a separate metal ring positioned above the indexing ring) cause the indexing ring to frictionally engage the piston during the lower half of the piston's to-and-fro longitudinal travel, the indexing ring and piston being essentially frictionally disengaged during the upper half of the piston travel. The reciprocating motion of the indexing ring is thereby transmitted to the piston during one half of said motion whereby the piston is caused to rotate in one direction about the spherical bearing.

BACKGROUND OF THE INVENTION

Indexing pistons for internal combustion engines (that is, a piston that is caused to rotate about its longitudinal axis as the piston travels longitudinally back and forth within the cylinder) are well known in the art. For example, Swiss Patent 200,762 discloses an indexing piston in which the indexing member is in the form of a reciprocating slotted ring having a friction surface that is adapted to be thrust into frictional engagement with a mating friction surface on the piston by means of the pivoting motion of the connecting rod relative to the piston. The indexing ring frictionally engages the piston in one direction of movement of the connecting rod while in the other direction of movement it slides over the mating friction surface of the piston. This type of indexing piston normally provides excellent results with respect to the progressive rotation of the piston about its axis. However, the relative movement of the indexing ring and the piston eventually wears away their mating friction surfaces to the point that no further indexing motion of the piston will take place. Moreover, as the frictional engagement of the indexing ring with the piston is caused by the pivoting motion of the connecting rod, a substantial part of this pivoting motion must be applied to effecting this engagement. As a result, only part of the pivoting motion of the connecting rod can be utilized for effecting actual rotation of the indexing piston.

SUMMARY OF THE INVENTION

I have now devised an improved indexing piston in which the indexing means is caused to frictionally engage the piston as a consequence of and in phase with the longitudinal to-and-fro movement of the piston independently of the pivoting motion of the connecting rod relative to the piston. That is to say, the indexing means is caused to reciprocate relative to the longitudinal axis of the piston by the pivoting motion of the connecting rod. However, frictional engagement between the indexing means and the piston is effected by inertial mass means associated with the indexing means independently of the pivoting motion of the connecting rod. The indexing piston assembly of my invention comprises a trunk piston mounted on the end of a connecting rod by a piston bearing that permits the piston to rotate about an axis coinciding with the longitudinal axis of the piston. Piston indexing means are mounted within the piston adjacent the pivot point at the end of the connecting rod, said indexing means being free to reciprocate about the longitudinal axis of the piston in a plane substantially perpendicular to said axis. Reciprocating drive means are mounted on the connecting rod adjacent the pivot point thereof, said drive means engaging drive means receiving notches formed in the indexing means whereby the pivoting motion of the connecting rod relative to the piston causes the indexing means to reciprocate about the longitudinal axis of the piston. The indexing means have at least one friction surface adapted to frictionally engage a cooperating friction surface on the piston when said friction surfaces are forced together. Inertial mass means associated with the indexing means alternately apply and release a friction surface engaging force to the indexing means as a consequence of and in phase with the longitudinal movement of the piston, said force being applied for about one half of each complete to-and-fro cycle of longitudinal movement of said piston and being released for the remaining portion of said complete to-and-fro cycle.

In an advantageous embodiment of my invention, the piston is mounted on a spherical bearing located at the small end of the connecting rod, the bearing being provided with a pair of reciprocating drive members disposed on opposite ends of the bearing on a line that extends through the center of the bearing, one of the drive members being located slightly below and the other drive member being located slightly above the pivot axis of the connecting rod. The indexing ring encircles the spherical bearing approximately in the plane of the pivot axis of the connecting rod, the indexing ring being provided with an upwardly extending notch which engages one of the reciprocating drive members of the bearing and with a downwardly extending notch which engages the other reciprocating drive member of said bearing. The underside of the indexing ring is provided with a friction surface which is adapted to frictionally engage a mating friction surface of the piston, and an inertial mass means comprising a metal ring is disposed above the indexing ring. During the lower half of the longitudinal up and down travel of the piston the annular mass means presses against the indexing ring with considerable force, thereby frictionally engaging the mating friction surface of the indexing ring and the piston and causing the piston to rotate with the indexing member. Conversely, during the upper half of the longitudinal travel of the piston the inertial mass member moves away from the indexing ring, thereby permitting the indexing ring to rotate without also causing the piston to rotate.

The friction surface engaging force applied by the inertial mass means may be supplemented by the mass force exerted by cooling oil contained in oil-cooled pistons, or it can be supplemented by the application of pressurized lubricating oil from the lubricating system of the engine to the mass member in the manner hereinafter described. Moreover, the inertial mass employed to supply the friction surface engaging force may be the mass of the indexing ring itself or it may be the total mass of the piston. In all cases, however, the friction surface engaging force is applied by the inertial mass means independently of the pivoting motion of the connecting rod of the piston assembly.

BRIEF DESCRIPTION OF THE DRAWING

The invention will be more fully described in conjunction with the accompanying drawings of which

DETAILED DESCRIPTION

Figure 1:
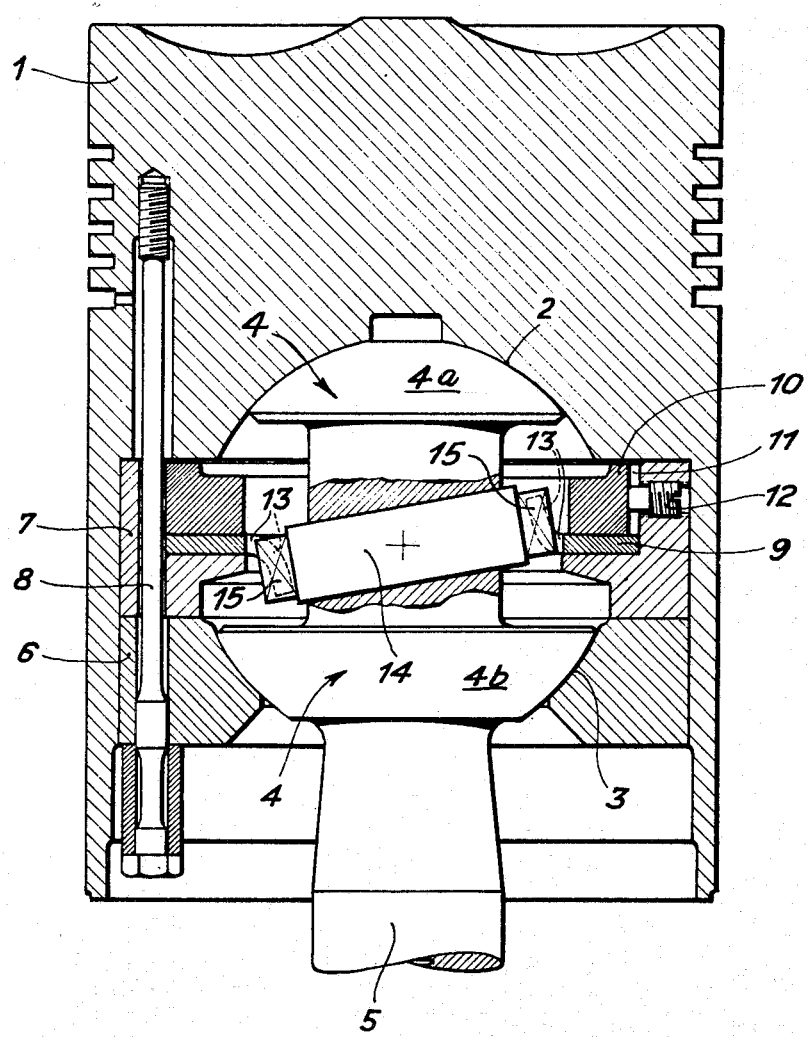
FIG. 1 is a sectional view through the center of an indexing piston embodying my invention, the spherical bearing at the upper end of the crankshaft being shown partly whole and partly in section.

In each of the embodiments of my invention shown in the drawings the indexing piston assembly comprises a trunk piston rotatably mounted on a spherical piston bearing located at the small end of a suitable connecting rod. In each case the axis of the engine crankshaft (which is not shown in the drawing) lies in the plane of the drawing. Accordingly, the small end of the connecting rod pivots about an axis that also lies in the plane of the drawing, and the lower portion of the connecting rod moves or pivots back and forth in a plane perpendicular to the plane of the drawing.

In the embodiment of my invention shown in FIG. 1, the trunk piston 1 of an internal combustion piston engine is provided with upper and lower spherical bearing surfaces 2 and 3 which cooperate with upper and lower bearing surfaces 4a and 4b of the sperical bearing head 4 of connecting rod 5. The lower bearing surface 3 of the piston is formed in an annular bearing member 6 which bears against an intermediate spacer ring 7, the bearing member 6 and spacer ring 7 being secured to the piston 1 by means of an extension bolt 8. The spacer ring 7 is provided with a recess in which an annular indexing member 9 and an annular inertial mass member 10 are disposed, the indexing member 9 and mass member 10 having sufficient vertical and lateral clearance to permit the indexing member to move freely with respect to the mass member 10 and the spacer ring 7. The annular mass member 10 is provided with an axially extending groove 11 which is engaged by the inner end of a screw 12 screwed into the ring 7, whereby the mass member 10 is prevented from rotating relative to the piston 1. The indexing member 9 is provided with two inwardly extending drive elements 13 positioned diametrically opposite each other, each drive element 13 being formed with a notch adapted to receive one of the reciprocating drive members 15 located at opposite ends of the pin 14. (It should be noted that the plane of the drawing bisects the drive member-receiving notch formed in each element 13.) The axis of the pin 14 extends through the center of the spherical bearing head 4 and is inclined relative to the axis of the connecting rod 5. One of the drive members 15 is thus positioned slightly below the axis about which the spherical head 4 of the connecting rod pivots and the other drive member 15 is located slightly above the pivot axis of the connecting rod 5. The two drive members 15 thus form two eccentric drive elements which serve to move the indexing member 9 reciprocally back and forth about the longitudinal axis of the piston 1 in the manner hereinafter described.

When the internal combustion piston engine is in operation the piston 1 travels longitudinally to-and-fro within the cylinder while the connecting rod 5 pivots back and forth relative to the piston about the axis of the spherical bearing head 4. (As noted, the axis about which the connecting rod 5 pivots is located in the plane of the drawing, and therefore the connecting rod pivots backwards and forward in a path perpendicular to the plane of the drawing. Owing to the vertical displacement of the drive members 15 relative to the pivot axis of the connecting rod 5, the reciprocating pivoting motion of the connecting rod relative to the piston 1 imparts a reciprocating rotational movement to the indexing member 9 with which the drive members 15 are engaged. The maximum speed of the back and forth pivoting motion of the connecting rod 5, and hence the maximum speed of the rotational movement of the indexing member 9, occurs when the connecting rod 5 and the piston 1 reach top dead center and bottom dead center in their reciprocating paths of travel.

As the piston 1 reciprocates to-and-fro (usually, up and down) along its longitudinal axis, the inertial mass member 10 alternately moves against and then moves away from the index member 9. Specifically, the mass member 10 moves against the index member 9 when the piston moves through the lower half of its to-and-fro path of travel (that is, during the deceleration period of the downstroke and the acceleration period of the upstroke of the piston). In like manner, the mass member 10 moves away from the index member 9 when the piston moves through the upper half of its reciprocating path of travel (during the deceleration period of the upstroke and the acceleration period of the downstroke of the piston). Thus it will be seen that the maximum speed of rotation of the indexing member 9 in one direction occurs when the mass member 10 bears against the indexing member, and that the maximum speed of rotation of the indexing member 9 in the opposite direction occurs when the mass member 10 has moved away from the indexing member.

During operating phases of the piston engine in which the mass force of the inertial mass member 10 thrusts against the indexing member 9, the mating friction surfaces of the mass member 10, the indexing member 9 and the spacer ring 7 are clamped together and act in the same manner as a friction clutch. The piston 1 is thereby frictionally coupled to the indexing member 9 and is caused to rotate slightly as a result of the rotational movement of the indexing member. When the mass force of the mass member 10 acts in the opposite direction, that is to say away from the indexing member 9, the indexing member will rotate without entraining the piston 1. Owing to the relatively low forces that are required to rotate the piston 1, the inertial mass member 10 needs to have a relatively small mass in order to carry out the function hereinabove described. This is due to the fact that accelerations of the order of 300 to 1,000 g are attained in the piston during operation of the engine, these extremely high g forces being responsible for the correspondingly high mass forces exerted by the mass member 10.

As noted, the inertial mass member 10 bears against the mating frictional surface of the indexing member 9, and the indexing member 9 bears against the mating frictional surface of the spacer ring 7 in the manner of a friction clutch. Wear of the mating friction surfaces of these parts takes place at a very slow rate since the frictional surfaces move with relation to each other only in the unloaded condition. However, even substantial wear on the friction surfaces of these parts will not have any substantial effect on the functioning of the indexing mechanism.

Figure 2:
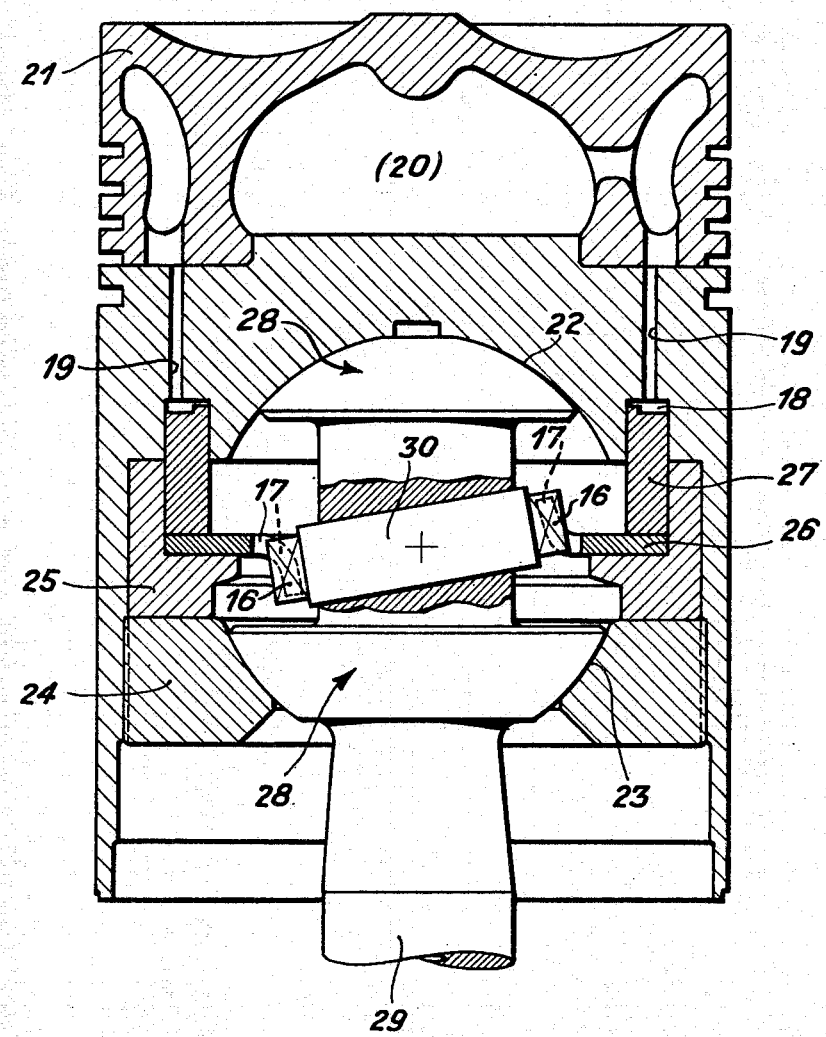
FIG. 2 is a sectional view, similar to FIG. 1, of a modified embodiment of my invention utilizing an oil-cooled indexing piston.

In the embodiment of my indexing piston assembly shown in FIG. 2, the mass effect of cooling oil 20 contained in an oil-cooled piston 21 is utilized to supplement the mass effect of the inertial mass member 27 of the piston. As in the case of the piston 1 shown in FIG. 1, the piston 21 shown in FIG. 2 is provided with spherical bearing surfaces 22 and 23, a bearing member 24, a spacer ring 25, an annular indexing member 26 and an annular inertial mass member 27. The piston 21 is rotatably mounted on the spherical bearing head 28 of the connecting rod 29. An inclined pin 30 extends through the center of the spherical head 28, the pin 30 having longitudinally displaced drive members 16 disposed at opposite ends thereof. The drive members 16 are received in drive member receiving notches formed in two diametrically opposed inwardly extending drive elements 17 of the indexing member 26.

The inertial mass member 27 is an elongated metal ring the bottom of which is adapted to bear against the indexing member 26 and the upper part of which is received in an annular recess 18 formed in the piston 21, the member 27 being free to move slightly into and out of contact with the indexing member 26. The cavity in which the cooling oil 20 is contained communicates with the recess 18 by means of the oil passageways 19 so that the pressure of the oil 20 is applied directly to the top of the mass member 27.

In this embodiment of the indexing piston, the mass member 27 functions in the same manner as the mass member 10 of the embodiment illustrated in FIG. 1. However, the mass effect of the mass member 27 is supplemented by the mass effect of the oil 20 disposed in the cooling oil chamber, the pressure of said oil being transmitted via the passageways 19 to the mass member 27. The aforementioned supplemental mass effect is obtained without any further increase of the operating weight of the piston since the oil must in any case be provided in oil-cooled pistons.

Figure 3:
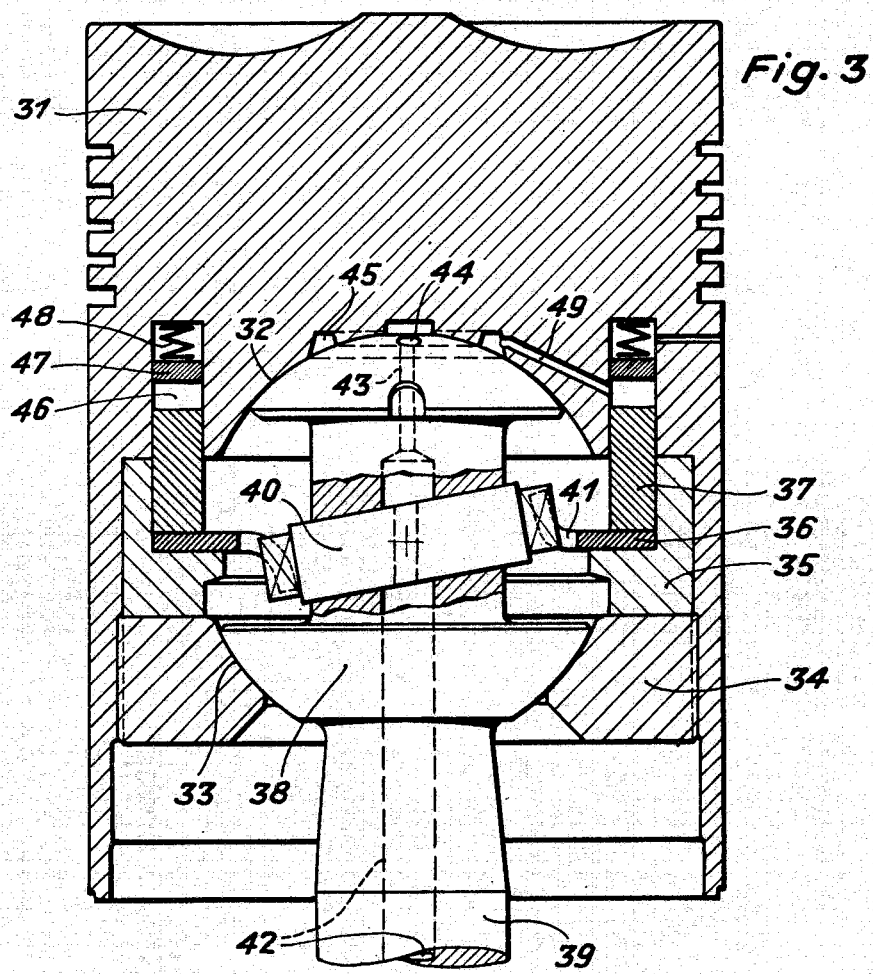
FIG. 3 is a sectional view, similar to FIG. 1, of a modification of my invention utilizing lubricating oil pressure to increase the frictional forces.
Figure 4:
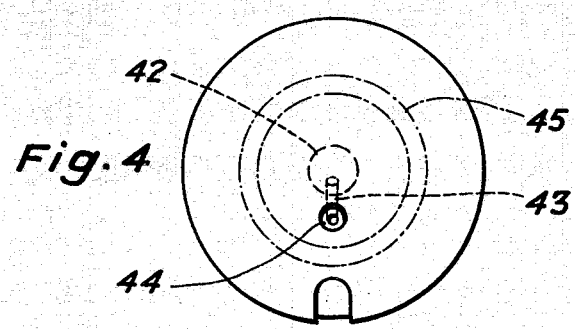
FIG. 4 is a view from above of the spherical bearing of the piston assembly shown in FIG. 3, and FIGS. 5, 6 and 7 are sectional views, similar to FIG. 1, of three additional modifications of the indexing piston of my invention.

In the embodiment of the indexing piston assembly shown in FIGS. 3 and 4, the mass effect of the mass means 37 is supplemented by the pressure of lubricating oil from the pressure lubricating system of the engine. As in the case of FIG. 1, in this embodiment the piston 31 is provided with spherical bearing surfaces 32 and 33, a bearing member 34, a spacer ring 35, an indexing member 36 having inwardly extending drive elements 41 and the aforementioned inertial mass member 37. The piston 31 is mounted on the spherical bearing head 38 of the connecting rod 39. An inclined pin 40 extends through the center of the head 38, the pin 40 being provided with drive members which engage the drive elements 41 in the manner previously described.

As shown in FIGS. 3 and 4, the connecting rod 39 is provided with an axial bore 42 through which lubricating oil from the lubricating system of the machine is supplied. The bore 42 extends into an inclined passageway 43 which extends outwardly through an aperture 44 in the top of the spherical head 38. An annular groove 45 is formed in the bearing surface 32 of the piston, said groove being connected via bore 49 to the annular recess 46 in which the upper part of mass member 37 is received. An annular accumulator piston 47 is also received in the annular recess 46, the upper end of the piston 47 bearing against a plurality of helical springs 48.

When the internal combustion engine is in operation, the indexing member 36 and the mass member 37 function in the same manner as the corresponding parts of the previous embodiments. However, at a predetermined time during the pivoting motion of the connecting rod 39, the aperture 44 communicates with the groove 45, thereby placing the bore 42 in communication with the recess 46. Accordingly, oil at lubricating pressure from the bore 42 penetrates into the annular groove 45 and thence into the recess 46, thereby causing the mass member 37 to be thrust against the indexing member 36 at the rhythm of the pivoting motion of the connecting rod 39. On each occasion when the groove 45 is in communication with the bore 42 the accumulator piston 47 is moved upwardly against the force exerted by the springs 48. This movement causes pressurized oil to be stored in the recess 46 between the parts 37 and 47, the pressure of said oil continuing to act on the member 37 after the connection with the main supply of lubricating oil is shut off. The pressurized oil in the recess 46 will eventually be dissipated due to leakage. However, conditions are so selected that the pressurized oil remains effective, before its pressure disappears owing to leakages, as long as is required or is favorable for the functioning of the indexing piston.

Figure 5:
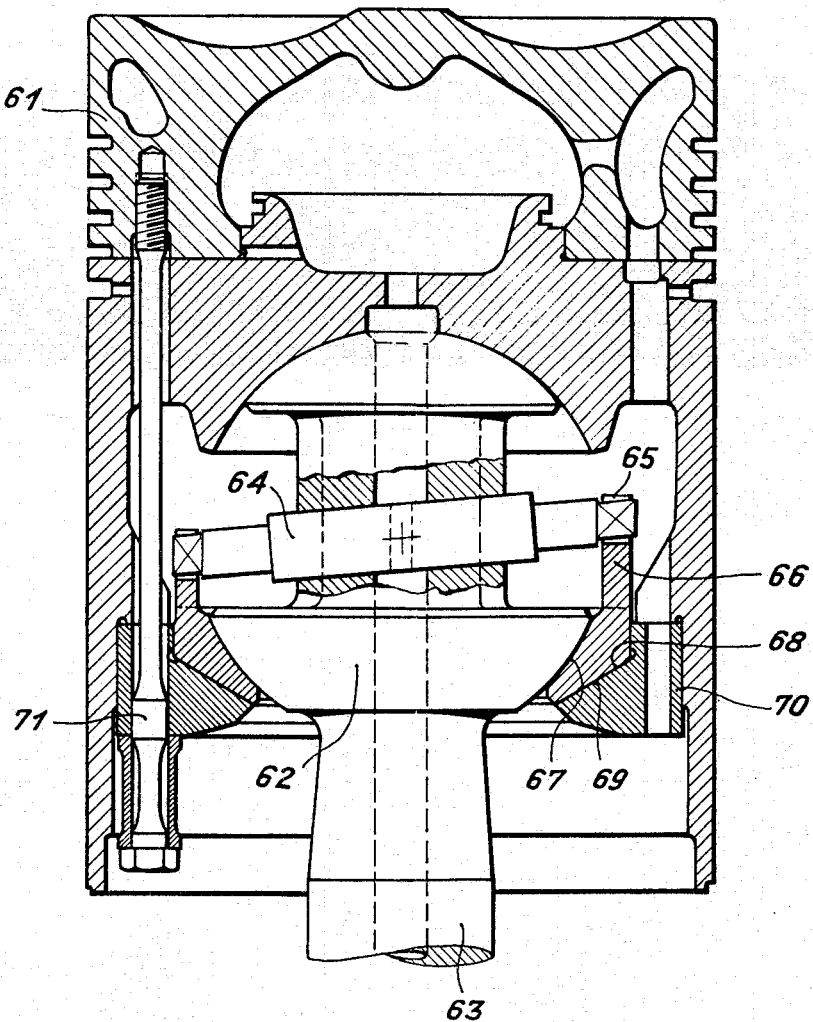
Figure 6:
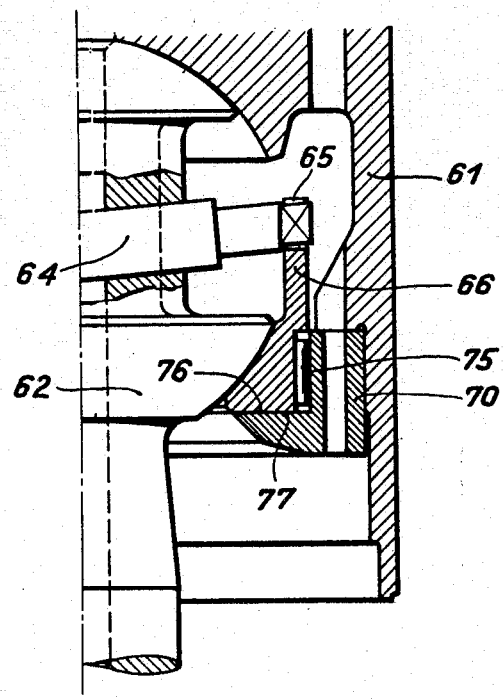

In the embodiments of the indexing piston assembly shown in FIGS. 5 and 6, the inertial mass means comprises the piston 61. As shown in FIG. 5, the indexing piston 61 is rotatably mounted on bearing head 62 of connecting rod 63. The connecting rod 63 is provided with an inclined pin 64 the drive members of which engage the drive elements 65 of an indexing member 66. The indexing member 66 is provided with a spherical bearing surface 67 for the lower bearing surface of the head 62. The indexing member 66 is also provided with a tapered friction surface 68 that cooperates with friction surface 69 of the annular part 70 which is mounted by screws 71 in the piston 61.

As noted, in the embodiment illustrated in FIG. 5 the mating friction surfaces 68 and 69 are loaded principally by the mass force of the entire piston 61. This takes place during the upper half of the longitudinal up and down movement of the piston, the indexing member 66 being forced against the lower bearing surface of the head 62 during this period. Since the indexing piston 61 is rotated principally while it is in the zone of the upper top dead center, it is particularly suitable for use on four-cycle engines in which the piston is not loaded during the idling stroke by gas force which would increase lateral friction in the cylnider.

In the embodiment shown in FIG. 6, whose principles correspond with those of the embodiment of FIG. 5, a radial roller bearing 75 is provided between the indexing member 66 and the annular part 70. Moreover, the tapered friction surfaces 68 and 69 of the embodiment shown in FIG. 5 are replaced by planar friction surfaces 76 and 77. The radial rolling bearing 75 absorbs lateral forces which are transmitted from the lower part of the bearing head 62 into the indexing member 66. These lateral forces originate from the inclined position of the connecting rod 63 and are transferred by the bearing 75 to the piston and thence to the cylinder wall.

Figure 7:
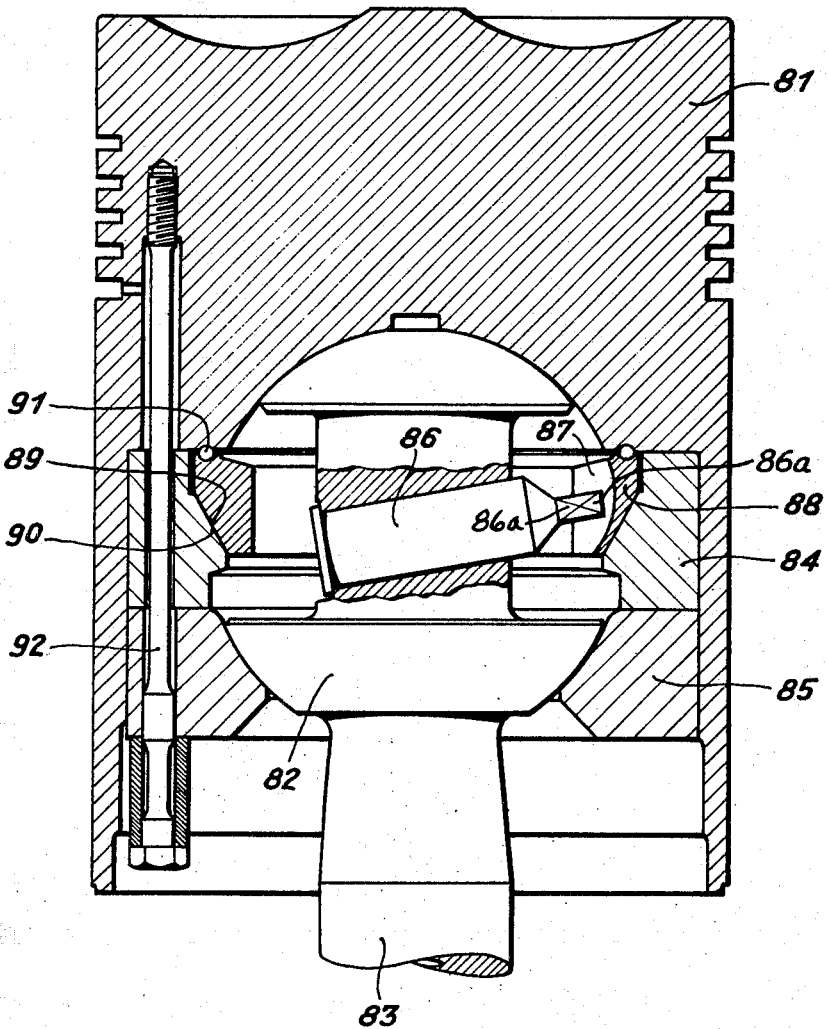

In the embodiment of the indexing piston shown in FIG. 7, the inertial mass member comprises the indexing member 88 which possesses by itself sufficient mass to make the indexing mechanism function properly. The piston 81 is mounted on the spherical head 82 of the connecting rod 83. A spacer ring 84 and a bearing ring 85 are provided in the piston 81 as in the previous embodiments. The head 82 of the connecting rod is provided with an inclined pin 86 which in this case is provided with only one drive member 86a adapted to engage in the notched drive element 87 of the indexing member 88. The indexing member 88 is provided with a conical friction surface 89 which cooperates with a corresponding friction surface 90 of the spacer ring 84. A rolling thrust bearing 91 is disposed between the indexing member 88 and the piston 81. The annular parts 84 and 85 are screw-mounted in the piston 81 by means of screw 92. During the reciprocating motion of the piston 81 the indexing pin 86 is reciprocatingly pivoted in the manner already described. Depending on the direction of thrust imparted by the effect of the decelerating or accelerating forces, the friction surface 89 of the indexing member 88 is either thrust against the friction surface 90 of the spacer ring 84 or it bears against the roller bearing 91. In one case, the piston 81 will be entrained and in the other case the indexing member 88 will roll frictionlessly relative to the piston 81.

The friction surfaces formed on the indexing member and in the piston, can be provided with at least one layer of a material which is suitable for frictional conditions. These are known materials employed, for example, for friction clutches. Grooves can also be formed in at least one of the cooperating friction surfaces to supply lubricating oil between said friction surfaces and to discharge said oil when the friction surfaces are thrust against each other.

It will be evident that various modifications of the embodiments shown in the drawings are possible within the scope of the invention. For example, all the illustrated embodiments may be constructed optionally with drive members at one or both ends of the pin 14 (or its counterpart). In some circumstances it may be advantageous for the indexing members or for the mass members to be disposed in the reverse order to that shown in the illustrated embodiment. Moreover, as previously mentioned, a plurality of plate-shaped indexing members and a plurality of plate-shaped mass members may be disposed superjacently in the manner of known plate clutches.

I claim:

1. An indexing piston assembly for an internal combustion piston engine, said assembly comprising a trunk piston rotatably mounted on the small end of a connecting rod, a piston indexing ring mounted within the piston adjacent the pivot point at the small end of the connecting rod, reciprocating drive means mounted on the connecting rod adjacent the pivot point thereof, said drive means engaging drive means receiving notches formed in said indexing ring, said indexing ring having at least one friction surface adapted to frictionally engage a cooperating friction surface formed on the piston when said friction surfaces are forced together, said friction surfaces being inclined to the axis of movement of said piston, and inertial mass means associated with said indexing ring, said mass means alternately applying and releasing a friction surface engaging force to said indexing ring as a consequence of and in phase with the longitudinal to-and-fro movement of the piston.

2. The indexing piston according to claim 1 in which the trunk piston is mounted on a spherical bearing at the small end of the connecting rod and in which a pin extends through the center of the spherical bearing in the plane of and at an angle to the axis about which the connecting rod pivots, at least one end of said pin being provided with reciprocating drive means.

3. The indexing piston according to claim 1 in which the inertial mass means comprises a metal ring disposed in the piston above the piston indexing ring, said metal ring being free to move longitudinally into contact with and then away from the indexing ring as a consequence of the longitudinal to-and-fro movement of the piston.

4. The indexing piston according to claim 3 in which the metal ring is prevented from rotating relative to the piston.

5. The indexing piston according to claim 3 in which the mass force of the metal ring applied to the indexing ring is supplemented by the mass force of a body of cooling oil contained in the piston.

6. The indexing piston according to claim 3 in which the mass force of the metal ring applied to the indexing ring is supplemented by the pressure of lubricating oil supplied by the pressurized lubricating system of the engine, the flow of pressurized lubricating oil to the metal ring being alternately turned on and turned off by valve means operated by the back-and-forth pivoting motion of the connecting rod relative to the piston.

7. The indexing piston according to claim 1 in which the inertial mass means comprises the mass of the indexing ring.

8. The indexing piston according to claim 1 in which the cooperating friction surfaces of the indexing ring and the piston lie in a plane perpendicular to the longitudinal axis of the piston.

9. The indexing piston according to claim 1 in which the cooperating friction surfaces of the indexing ring and the piston lie in the surface of a cone the axis of which coincides with the longitudinal axis of the piston.

10. The indexing piston according to claim 1 in which a roller thrust bearing is positioned between the cylindrical outer surface of the indexing ring and the inner cylindrical surface of the piston.

11. The indexing piston according to claim 1 in which the inertial mass means comprises the piston.

References Cited

UNITED STATES PATENTS

| 634,654 | 10/1899 | Whitcomb | 92—31 XR |
| 1,670,549 | 5/1928 | Pearce | 92—31 XR |
| 2,096,562 | 10/1937 | Sarfaty | 92—31 |
| 2,819,936 | 1/1958 | Cambeis | 92—31 |
| 2,902,987 | 9/1959 | Schweitzer | 92—31 XR |

FOREIGN PATENTS

| 794,282 | 4/1958 | Great Britain. |
| 940,690 | 9/1962 | Great Britain. |

MARTIN P. SCHWADRON, Primary Examiner

L. J. PAYNE, Assistant Examiner

U.S. Cl. X.R.

92—187